US007916777B1

(12) United States Patent
Johnson et al.

(10) Patent No.: US 7,916,777 B1
(45) Date of Patent: Mar. 29, 2011

(54) VUTP HYBRID COMMAND AUTHORITY

(75) Inventors: Jesse A. Johnson, Spring, TX (US); Kevin Mayer, Bevalillo, NM (US); Jose Fernandez, Sunrise, FL (US); Stephen Vowell, Houston, TX (US)

(73) Assignee: Global Communications Inc., The Woodlands, TX (US)

( * ) Notice: Subject to any disclaimer, the term of this patent is extended or adjusted under 35 U.S.C. 154(b) by 5 days.

(21) Appl. No.: 12/512,003

(22) Filed: Jul. 29, 2009

Related U.S. Application Data

(63) Continuation-in-part of application No. 11/695,644, filed on Apr. 3, 2007.

(60) Provisional application No. 61/215,245, filed on Apr. 30, 2009.

(51) Int. Cl.
*H04B 1/38* (2006.01)
(52) U.S. Cl. ........................................................ 375/222
(58) Field of Classification Search .................. 375/280, 375/222; 725/118, 126; 712/32, 228; 370/229, 370/328, 348
See application file for complete search history.

(56) References Cited

U.S. PATENT DOCUMENTS

| 6,516,352 B1 | 2/2003 | Booth et al. |
| 7,489,732 B2 * | 2/2009 | Cheng ........................... 375/260 |
| 2005/0238113 A1 | 10/2005 | Santhoff et al. |
| 2007/0217414 A1 | 9/2007 | Berkman et al. |
| 2007/0245393 A1 | 10/2007 | Fernandez |
| 2008/0268838 A1 | 10/2008 | Zufall et al. |

OTHER PUBLICATIONS

International Search report for co-pending PCT Application No. PCT/US10/33163 dated Jul. 13, 2010.

* cited by examiner

*Primary Examiner* — Khai Tran
(74) *Attorney, Agent, or Firm* — Bracewell & Giuliani

(57) ABSTRACT

An Autointelligent sensing and analysis method that comprises: differentiating between digital and analog communication; controlling access authorities both locally and remotely; and making intelligent analysis on the Static or Dynamic utilization of the electrical utility under management on a parallel computational basis.

20 Claims, 9 Drawing Sheets

REPLACEMENT PAGE

FIG. 4. FDDI TO VUTP DIAGRAM

FIG. 5. FDDI TO VUTP AND LAN DIAGRAM

FIG. 6. FVUTP DIAGRAM

VUTP HYBRID COMMAND AUTHORITY

CROSS REFERENCES TO RELATED APPLICATIONS

This application claims priority to and the benefit of U.S. Provisional Application Ser. No. 61/215,245, titled "VUTP Hybrid Command Authority" filed on Apr. 30, 2009, and is a continuation-in-part of and claims priority to U.S. patent application Ser. No. 11/695,644 filed on Apr. 3, 2007, titled "System and Method for Dynamic Allocation of Spectrum" (the "VuTP DBW App."), each incorporated by reference in their entirety.

BACKGROUND OF THE INVENTION

1. Field of the Invention

The invention relates generally to telecommunication systems and methods for maintaining transmission bandwidth, and more particularly systems and methods for providing dynamic assignment and management of frequency bands of a communications spectrum.

2. Description of the Related Art

Video over Unshielded Twisted Pair copper wires ("VUTP") has benefits in many applications, including applications where quality of service ("QoS") is a requirement, and where multiple channels of video are needed to be distributed over the same copper wire.

Issues/challenges that often arises in communication systems which are land based and even those which are wireless, include: maintaining sufficient transmission bandwidth, and being able to scale the number of electrical devices on the network sufficiently to satisfy QoS requirements. These challenges are accentuated in instances where copper wire telephone lines are employed in such systems for the transmission of bandwidth intensive signals, such as video, because such signals rapidly degrade when transmitted over twisted pair wires of meaningful length. However, given the existence of twisted pair wires in many buildings and communication networks which extend to residential, commercial wire line networks, and also those extended to provide capacity to Mobil Phone towers in "Back Haul" communications networks, the cost associated with the scaling of these links require a solution/alternative to retrofitting existing twisted pair wires with alternative links. A drain on resources results from the effort to continue QOS as the network is required to scale due to consumption of video based services in the Local areas and Wide Area Networks which extend to mobile or GSM mobile towers.

It is desirable to transmit such signals over twisted pair wires for a variety of applications, including video communication systems. It is also desirable to provide IT/Data interoperable software applications from a plurality of vendors which enable large scale authorizations of channels and allocate them for the purpose of providing control over multiple devices from independent manufacturers of equipment receiving and taking commands from multiple software programs and to provide an API with or without an IP (Internet Protocol) address. It is also desirable to bundle them through distribution of one control authority which can allocate each application and service dynamically based on the need and the ability to scale. Accordingly, there is a need for a system that provides a means to use twisted pair wires for high data bandwidth applications enabling all software, IT/Data, Security and Facility Management Systems to be fully interoperable and displayed across phone lines in video based interfaces.

The ignition of heretofore unexperienced (unheard of) demand for broadband spectrums, is fueled in part by a recent explosion in demand for full real time motion video, high resolution images, and defined quality of services. Such demand has also resulted in a need for systems which combine standard communications, entertainment, data, security and facilities management under one authorized allocation of signals with infrastructure to be utilized, in order to decrease the associated financial challenges of providing these services, and has resulted in a need for systems and methods of scaling them. The inability to scale has challenged the full scale deployment of IPTV, Wi-Fi, and Wimaxx based services in communications and has heretofore limited their ability to be integrated with full scale IT and Security applications operating simultaneously on the same infrastructure with the same control authority.

While existing phone systems nominally pass voice signals between 0.3 and 3.4 kHz, twisted pair wires are capable of carrying frequencies well beyond such 3.4 kHz upper limit. In certain twisted pair wires, the upper limit can be hundreds of megahertz depending on the length and quality of the wire extended by means of interface with wireless optics (hybrid, adaptive and wide lenses as referred to in this application).

Exemplary equipment for such applications are disclosed in the VuTP DBW App., which is incorporated by reference for such teachings.

Previously and currently known technologies have attempted to quench demands with near broadband services, such as DSL, ADSL wire line communications, and with services supported by fiber optics that require a physical conduit, and related technologies such as Wi-Fi, and Wimaxx based services that operate on extended wireless network platforms, both in the local area and the wide area—all of which provide digital data transmission at some point by interconnecting to the telephone wires of a local telephone network. However, these technologies employ a "fixed" frequency allocation according to DSL provider specifications. For example, DSL allocates a finite set of frequency bands for uplink and downlink above the 3.4 kHz upper limit.

Another problem with DSL and Wi-Fi or Wimax, is that at the end of their transmissions, their signals are often required to pass over copper wires where they deteriorate rapidly and unevenly across the frequency spectrum with increasing length of the copper communication wire. By natural attributes, DSL, Wi-Fi, and Wimax do not lend themselves to the combination of providing service applications of multiple disciplines beyond basic communications and internet connectivity. Simply put, DSL, Wi-Fi and Wimaxx, because of this singular attribute, do not integrate itself/themselves into the functional control authority of IT Data, Security systems, Content Delivery and Facilities Management on the same infrastructure delivery with Intelligent or Smart devices or with systems that can extend into mechanical and electrical systems which do not have an IP address. This lack of integration resultingly limits application to systems which require larger volumes of bandwidth. Accordingly, it is recognized that scalable control management integrated with sophisticated data management systems can enable users to benefit from advances in software and hardware from multiple vendors bi directionally on a scalable basis with fault redundancy carried out in full extension to all Electrical Devices, not only those which are identified with communications based on internet delivery.

By failing to scale in a parallel fashion as a basic tenant of its delivery platform, these services are not able to extend nationally or globally as demands increase, creating a failure to deliver QOS for a fully integrated service offering on a city wide or national basis.

The VuTP DBW App. includes a more detailed discussion of such deterioration and correction of same.

Other previously and currently known technologies employ fully digital services, such as E1/T1, in an attempt to satisfy the aforementioned demands for bandwidth. However, such services are often cost prohibitive in that they often require additional voltage, wiring, multiple demands for special equipment at each end of the line, and require conditioning to prepare for such services. In most all situations when construction and engineering projects are initiated, multiple conduits must be provided as a result of DSLs inability to handle Security, Videoconferencing, Facility Management and Cable Television working simultaneously, and DSLs inability to function on an interoperable basis with IT and Data management systems and software from multiple vendors and facility management systems.

VUTP (as that term is broadly defined in the VuTP DBW App., which definition is hereby incorporated by reference) provides a cost effective and efficient alternative to currently known technologies to the allocation of frequency bands to meet the above and other needs.

VUTP also provides communications operators a ready-to-use high bandwidth transmission interface because twisted pair wires presently form the backbone of the local telephone infrastructure in the United States and other countries.

As alternative types of communications links are developed and as their bandwidth capacities are improved upon, facility and residential operators have a need to interconnect existing telephone infrastructures (being brought in from the Wide Area) with such links internal to the facility, which include legacy ICC electronic equipment already installed in existing facilities. The facility managers, however, lack the ability to integrate the existing telephone infrastructure with electronic computing systems, IT Data Systems and mechanical and electrical equipment on a unified and fully interoperable basis under one single command authority.

In recent times, optical, RF, and adaptive communications links have proved to offer a high transmission bandwidth link. Additionally, software which enables computing systems to provide interoperable software platforms which integrate operating systems control authority in data management have also been introduced.

Accordingly, due to the large scale embedded networks of copper across national territories globally, and the large number of electrical systems needing/requiring access to the network to be brought under command authority for IT and Data transmission purposes, there is currently a need to interconnect RF, optical and adaptive communications links with existing copper wire infrastructures to bridge communications links on a scalable parallel basis in order to maintain QOS on a scalable basis, which is interoperable with multiple vendors on an agnostic basis, but which has not been achievable in wire line nor wireless communication systems as user and consumption demands have increase—due to a lack of channel capacity. Also there is a need to provide interoperable agnostic management authorities which are not proprietary to only Internet Protocol delivery.

As an example, "Back Haul" communication networks for wireless carriers implementation of public carriers such as Wi-Fi and large capital requirements for Wimaxx delivery and extended G4, G5, G6, and G7 services, create enormous economic challenges.

Concurrently "last mile" delivery inside of homes and buildings with each individual device and IT (Information Technology) sub net architecture for security, cable TV, Video Conferencing, and holographic delivery of video on a closed loop, campus environment or city wide basis, is very publicly being directly impacted by failures in QOS. This is because users are utilizing the same communication pathway for computing, IT, security, and content delivery, with both on the land line and the wireless network being used to provide these services, and because the multiple groups of manufacturers and software developers are using protocols which are proprietary and lacking in the ability to scale beyond linearly—thus, creating problems in the facility and equipment external to it in the "back haul".

A solution is required for these activities to be bridged through a Hybrid network architecture utilized with or without the Internet, in analog or digital, while still maintaining the ability to scale.

A solution is needed which provides a Hybrid Computing Architecture that uses dynamic spectrum allocation to standardize the patterns and distribution of video across land line and wireless networks, simultaneously, and that can scale them across large scale geographic and terrestrial delivery stations on a city wide or national basis without regard to geographic or terrestrial considerations and that is integratable to all analog and all digital environments (not one or the other) while allowing itself on the OS stack to retain control authority over IP based hardware and electronics as well as legacy ICC equipment which operate on Serial Architectures.

This can be achieved by delivery of optical transmissions both natural and adaptive being managed by the Scalable Electronic control operating system identified as SECOS and integrating it with VUTP HYBRID Tivoli™ software on a Facility Commander Rx local distribution authority in facilities management.

The by product is the worlds first distributed city wide or national based command authority which can integrate the control of security applications, facility management, cable television, interactive and analytical data management for information technology and advertising, and command control of ICC, UL, and UDP based electronic equipment on the existing infrastructure of communications telephone networks and residential and facility based mechanical and electrical equipment and machinery already native to every country in the world.

SUMMARY OF THE INVENTION

A network product according to an embodiment of the present invention includes the worlds first distributed city wide or national based command authority which can integrate the control of security applications, facility management, cable television, interactive and analytical data management for information technology and advertising, and command control of ICC, UL, and UDP based electronic equipment on the existing infrastructure of communications telephone networks and residential and facility based mechanical and electrical equipment and machinery already native to every country in the world.

An embodiment of the present invention is directed to a system and method including a hybrid communications network, which uses a combination of Video over Unshielded Twisted Pair "VUTP" circuitry and optical and/or adaptive transmission links, as disclosed below, working with certain VUTP based software systems ("VUTP HYBRID" systems) and General Electric based Security system applications operating as one Hybrid—which is an improvement to all VUTP class intellectual property as well as an advancement in the field of wire line and wireless communications system integration. A further embodiment dynamically allocates spectrum over the hybrid communications network to enable it to manage and control multiple electronic systems' video, voice and data, from multiple vendors on an agnostic basis and extend that authority through fully interoperable IT Data Management Software working under a parallel computing architecture to thereby provide communication pathways for ICC and UCC, and UDP system and sub system level command and control reporting and broadcasting in channels allocated for NTSC, HDTV, and Stereoscopic Video in both the wide area. This can be accomplished, for example, by means of optical transmission of all forms wide band and adaptive and the local area by means of the ordinary telephone lines which are native to a facility.

With VUTP HYBRID, any authority can integrate all electrical systems such as IT, data, Cable Television, Video on Demand, Emergency Response, HVAC, lighting, mechanical, engineering, fire, and security systems to make them completely interoperable ("communicate with each other") even if they are made by completely different vendors, have nothing to do with each other, and are not current models, and allow them to simultaneously function and operate on a minimal cost of infrastructure to support and provide full redundancy, enabling entities (which utilize proprietary "Turnkey" integration package for federal facilities) to "upgrade" any of these systems or system components at will without concern to future costs associated with having to replace the entire system or having concern about future capabilities' ability to be interoperable.

This is a significant improvement to DSL, Wimaxx, and Mobile Communications Platforms which require the use of the national infrastructure of copper and mobile communications equipment that utilizes serial equipment. This, in the short term and the long term, lowers the initial costs for installation and creates a long term efficiency model for future advancements without future advancement costs being accelerated on a disproportionate basis—which at this point has been so extreme, it has led to the wide spread economic consolidation of most of the global telecommunications companies that are privately held and the widespread privatization of those which previously were Government owned and operated.

Traditionally, the architectures which presently exist require large scale capital improvements with significant economic requirements and have yet to produce a control system which can bring full scale interoperability between Information Technology Computing, Telecommunications, Security Surveillance, and Cable Television under one scalable parallel based architecture on one single network of existing infrastructure of telephone wire and electronic equipment from different manufacturers agnostically, utilizing the existing network of telephone wires in combination with optical transmission of data.

In any new situation which requires a form of consistency or interoperability across the entire city wide, or national networks which cover the entire geography of national boundaries, both land line based and those which are wireless, this platform can be deployed and utilized in one single "Turn-key" installation which can include connection to millions of electronic systems without the associated costs of deploying additional hardware in the form of Towers or Central switching stations across whole states—enabling costs to be decreased significantly if not diminished, while still maintaining DES encryption and other classified communication standards operating in Real Time with Redundancy and Fail Safe characteristics.

In order to realize such decreased costs according to an embodiment of the present invention, the system can operate in a clustered and nonclustered environment and can be deployed over many geographical areas or worldwide. This is because the computing architecture being utilized with VUTP is parallel based, as is the distributing architecture in the logic provided through its circuitry and its software control.

Various embodiments of the present invention include methods of providing communications over a hybrid communications network to a plurality of geographically separately located facilities each having a pre-existing network of conventional twisted pair wire, which can be accomplished with minimal retrofit requirements. According to an exemplary method, such method can include the steps of configuring a hybrid communications network to provide a network connection between a point of presence for a service provider (e.g., ISPs or Telco) and each of a first plurality of facilities (e.g., nearby facilities) over a corresponding first plurality of unshielded twisted pair wires (defining a first plurality of twisted pair links) extending between the point of presence and the corresponding first plurality of facilities. The steps can also include configuring the hybrid network to provide a network connection between the point of presence and each of a second plurality of facilities over a corresponding plurality of hybrid links extending between the point of presence and the corresponding second plurality of facilities, and configuring the hybrid network to provide a network connection between the point of presence and each of a third plurality of facilities over a corresponding plurality of optical-wireless links extending between the point of presence and the corresponding third plurality of facilities.

According to the exemplary configuration, each facility of the first plurality of facilities includes central premises equipment configured to receive and transmit data over an associated dedicated one of the first plurality of twisted pair links connected between the first plurality of facilities and the point of presence and configured to receive and transmit data over on-premises twisted pair wire pre-existing within the respective facility. Similarly, the point of presence, located remotely from each of the first plurality of facilities, includes point of presence equipment configured to receive and transmit data over each of the plurality of dedicated twisted pair links.

As this first plurality of facilities is provided broadband communications over twisted pair links, the distance between the point of presence and each separate one of the first plurality of facilities is generally within a range of approximately 6000 feet. Facilities, such as, for example, the second plurality of facilities may not be located within such range. As such, according to the exemplary configuration, hybrid network links between the point of presence and a second plurality of facilities can be provided where the distance between the point of presence and each separate one of the second plurality of facilities substantially exceeds a certain distance range that would prohibit efficient use of digital line subscriber and/or asymmetric digital line subscriber technologies, for example.

According to the exemplary configuration, each hybrid link includes one of a second plurality of twisted pair links, one of a plurality of alternative communication links (e.g., an adaptive network link and/or an optical network link), and twisted pair link-to-adaptive network link connection equipment (defining a respective intermediate connection node). Similar to the first plurality of facilities, each facility of the second plurality of facilities includes central premises equipment configured to receive and transmit data over an associated dedicated one of the plurality of hybrid links connected between the second plurality of facilities and the point of presence, and configured to receive and transmit data over on-premises twisted pair wire pre-existing within the respective facility.

As noted previously, there can be a third plurality of facilities where no twisted pair wires are available and/or where one or more of the third plurality of facilities is not in a line of sight to a desired connection point on a vertical member. In such situation, optical-wireless links can be utilized. Each optical-wireless link can include a common optical link extending between the point of presence and a common optical-wireless connection node configured to provide a separate wireless connection to each of the third plurality of facilities. Correspondingly, each facility of the third plurality of facilities includes central premises equipment configured to receive and transmit data over the wireless connection with the optical-wireless connection node, and configured to receive and transmit data over on-premises twisted pair wire pre-existing within the respective facility.

As further noted previously, an object of such hybrid communications network can include maximizing utilization of in-place twisted pair wire and minimizing any need to retrofit. To this end, each intermediate connection node is typically connected to a separately located pre-existing vertical member such as, for example, a pre-existing telephone pole, a pre-existing lighting pole, a roof of a pre-existing adjacent facility, or less ideally a pre-existing tower, such that each associated one of the second plurality of twisted pair links extend between the respective intermediate connection node and the corresponding point of presence equipment. Further, the associated one of a plurality of alternative communication links extend between the respective intermediate connection node and the central premises equipment located at the corresponding one of the second plurality of facilities.

Similarly, the common optical-wireless connection node is connected to a separately located existing vertical member such as, for example, a pre-existing telephone pole, a pre-existing lighting pole, a roof of a pre-existing adjacent facility, or a pre-existing tower located within wireless range of each of the third plurality of facilities.

According to the exemplary embodiment of the present invention, each customer premises equipment includes VUTP copper wires circuitry configured to provide transmission of a plurality of different signals, including video, telephone, and data signals, which can be multiplexed together and transmitted simultaneously over the same twisted pair link, utilizing a plurality of transmission frequencies, and/or done so over the multiple twisted pairs bundled together to form multiple twisted pair channels within each twisted pair link. The VUTP circuitry can include a transmitter and receiver combination for each twisted pair that is configured to operate at a transmission frequency above 2 MHz over conventional twisted pair wire, a frequency bandwidth allocator (e.g., frequency spectrum assignment module) configured to dynamically allocate a plurality of discrete bands of transmission frequencies for communication transmission over conventional twisted pair links based upon various characteristics such as, for example, type of service, data transmission demands, and/or quality of service guarantees, and can include an amplifier providing amplification and impedance matching circuitry, whereby the signal degrading effects of the impedance of a twisted pair link are reversed by the amplification and impedance matching circuitry. Note, greater signal amplification is typically provided to higher frequencies than to lower frequencies with the amount of application adjusted in response to a distance of signal travel. In order to determine the amount of amplification needed, internal or external circuitry can determine or be provided a length of the twisted pair link traversed by the signal, and compute an e.g., frequency-dependent compensation factor.

According to an exemplary embodiment of the method, the on-premises twisted pair wire includes at least one twisted pair wire (defining a common twisted pair wire) connected to television video, Internet, and telephone service equipment, and the method further includes the step of multiplexing a plurality of different types of service data on the common twisted pair wire whereby each type of service data (e.g., television video, Internet, and telephone service data) is afforded different spectrum allocation settings and protocol sequencing.

According to the exemplary embodiment of the method, the central premises equipment for each facility of the first and the second plurality of facilities is operably coupled to a plurality of different types of equipment, the on-premises twisted pair wire comprises a two-wire twisted pair forming a channel, the central premises equipment includes a transmitter connected to a first wire of the two-wire twisted pair forming the channel and a receiver connected to a second wire of the two-wire twisted pair, and the method further comprises the step of dynamically allocating discrete frequency bands over the first wire of the two-wire twisted pair forming the respective channel to optimize available channel bandwidth utilization for each channel for service provided to each facility.

The step of dynamically allocating discrete frequency bands can include various factors to enhance bandwidth utilization. For example, the dynamic allocation step can include determining a distance a certain signal will need to travel over the first wire of the two-wire twisted pair, physical properties of the first wire of the two-wire twisted pair, and current service demands of each piece of equipment of the plurality of different types of equipment to define utilization characteristics, and can include performing the dynamic allocation responsive to the utilization characteristics. The step can also or alternatively include assigning a discrete frequency band responsive to type of services available, customer service demands, and/or quality of service requirements, and adjusting the assigned frequency band in response to a change in the type of services available, the customer service demands, and/or the quality of service requirements.

According to the exemplary embodiment of the method, the method can further include the steps of assigning each of the plurality of different service types to a corresponding plurality of discrete frequency bands for transmission over the common twisted pair wire, employing control signals to initially configure frequency allocation assignments for each of the plurality of different service types, identifying signal degradation resulting in a reduction in quality of service below a threshold value for one of the plurality of service types, and dynamically reassigning a frequency range for transmission of a signal associated with the one of the plurality of service types experiencing signal degradation from a first prior assigned frequency range to a second assigned frequency range. For example, assuming that lower frequencies translate to improved signal strength, when the VUTP circuitry observes degradation in a signal associated with a certain service allocated to a frequency range from e.g., 5 megahertz to 7 megahertz resulting in greater than a maximum desired data loss, e.g., two percent data loss, then the circuitry can reallocate the service to a new frequency ranging, for example, from 5 megahertz to 6 megahertz. Also, if a specific harmonic causes crosstalk in a selected frequency range, the circuitry can reallocate the range to a higher range of frequencies, etc.

According to the exemplary embodiment of the method, the on-premises twisted pair wire includes a plurality of two wire twisted pairs forming a plurality of separate channels, the central premises equipment includes a plurality of transmitters each separately connected to a first wire of a pair of wires forming one of the plurality of separate channels and a plurality of receivers each connected to a second wire of the pair of wires forming one of the plurality of separate channels, and the method further includes determining a desired range of frequencies for transmitting a signal, determining frequency spectrum availability of the first wire each of the plurality of channels, and selecting one of the plurality of transmitters connected to the first wire of one of the plurality of channels from among the plurality of channels having frequency spectrum availability sufficient to support the desired range of frequencies for transmitting the signal.

Still further, according to the exemplary embodiment of the method, the above described steps for providing communications over a hybrid communications network are performed, at least in part, by the point of presence equipment. For example, the point of presence equipment can provide for multiplexing a plurality of different types of service data on common twisted pair wire associated with each of the first and the second plurality of twisted pair links whereby each type of service data can be provided different spectrum allocation settings and protocol sequencing.

The point of presence equipment can also include provisions for dynamically allocating discrete frequency bands over a first wire of a two-wire twisted pair forming a communications channel performed separately for each of the first and the second plurality of twisted pair links to optimize available channel bandwidth utilization. The step of dynamically allocating discrete frequency bands can include determining a distance a signal will travel over the first wire of the two-wire twisted pair, physical properties of the first wire of the two-wire twisted pair, and current service demands of each piece of equipment of the plurality of different types of equipment to define utilization characteristics, and performing the dynamic allocation responsive to the utilization characteristics. The step of dynamically allocating discrete frequency bands can also or alternatively include assigning a discrete frequency band responsive to the type of services available, customer service demands, and/or quality of service requirements, and adjusting the assigned frequency band in response to a change in the type of services available, the customer service demands, and/or the quality of service requirements.

The method can also include the point of presence equipment performing the steps of assigning each of the plurality of different service types to a corresponding plurality of discrete frequency bands for transmission over the common twisted pair wire, employing control signals to initially configure frequency allocation assignments for each of the plurality of different service types, identifying signal degradation resulting in a reduction in quality of service below a threshold value for one of the plurality of service types, and dynamically reassigning a frequency range for transmission of a signal associated with the one of the plurality of service types experiencing signal degradation from a first prior assigned frequency range to a second assigned frequency range.

According to an embodiment of the present invention, similar to the customer premises equipment, the point of presence equipment includes a plurality of transmitters each separately connected to a first wire of a pair of wires forming one of the plurality of separate channels and a plurality of receivers each connected to a second wire of the pair of wires forming one of the plurality of separate channels for each of the first and the second plurality of twisted pair links, and the method further includes performing the following for each link associated with each separate one of the first and the second plurality of facilities: determining a desired range of frequencies for transmitting a signal, determining frequency spectrum availability of the first wire each of the plurality of channels for the respective link, and selecting one of the plurality of transmitters connected to the first wire of one of the plurality of channels for the respective link from among the plurality of channels having frequency spectrum availability sufficient to support the desired range of frequencies for transmitting the signal.

DETAILED DESCRIPTION

VUTP Circuitry

In an embodiment of the present invention, VUTP circuitry includes a (a) transmitter and receiver combination that is capable of operating at a transmission frequency above 2 MHz over conventional twisted pair wires, (b) frequency bandwidth allocator that dynamically allocates bands of transmission frequencies for communication transmission over conventional twisted pair links based upon type of service, data transmission demands, and/or quality of service guarantees, and (c) unity gain amplification means. The unity gain amplification means preferably includes amplifier and impedance matching circuitry, whereby the signal degrading effects of the impedance of a twisted pair link are reversed by the unity gain circuitry.

The VUTP circuitry thereby supports transmission of a plurality of different signals, including video, telephone, and data signals, which can be multiplexed together and transmitted simultaneously over the same twisted pair link, utilizing a variety of transmission frequencies.

Examples of VUTP corrective circuitry are described in the VuTP DBW App. and in U.S. Pat. Nos. 5,528,286, 5,283,637, and 6,064,422, which are hereby incorporated by reference in their entirety. Corrective circuitry is particularly described in the '286 and '637 patents in columns 11-18 and is further described in the '422 patent in columns 8-10, for example.

VUTP corrective circuitry may be used for integrating video working with the existing Infrastructure for Internet Protocol Television ("IPTV"). For instance, when using video compression techniques and sending digital video for IPTV, via an IP over ADSL, for example, a network can be enhanced through the use of an optical light fiber transmission link and then converted and transmitted over the existing twisted pair inside the home. The hybrid network combinations described herein also provide transmission links for High Definition content.

For video conferencing or video telephony, open standard compression technologies over landline and MMS (with support for multiple compression formats) over wireless are available.

VUTP corrective circuitry and the optical and/or adaptive hybrid network of communication links have applications to both residential and commercial buildings. The hybrid network provides cost advantages by bridging commercial buildings and residential communities, already having extensive existing twisted pair wiring, by reusing this wire rather than re-cabling, with the adaptive and/or optical communication links.

A preferred way of accomplishing such services and transmissions in a residential environment includes sending the transmission a distance of, e.g., 1-40 kilometers via a mesh adaptive network from a point of presence ("POP") to key locations though out a neighborhood or city. Another preferred way includes sending the transmission to the customer's home or a POP connecting to the existing telephone wiring or a wireless access point.

Figure 1:
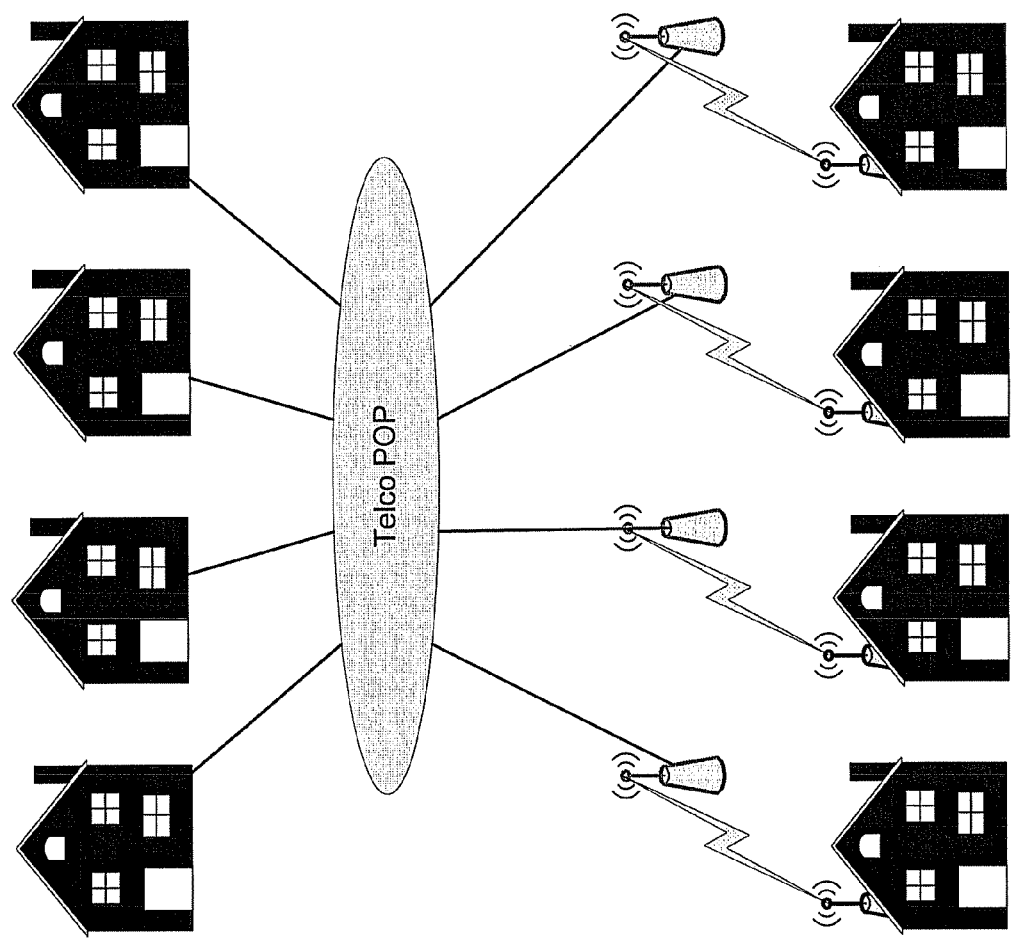
FIG. 1 is a diagram showing transmissions in a residential environment using twisted pair links to one set of homes, and adaptive/optical signal transmission/reception links to another set of homes according to an embodiment of the present invention.

In FIG. 1, the gray lightening bolt connection represents the adaptive links to homes equipped with customer premises equipment, where distance from the Telco POP prohibits use of ADSL/DSL technologies, for example.

In the upper half of FIG. 1, VUTP corrective circuitry and twisted pair copper wire exist within the home, and between the Telco POP. In the lower portion of FIG. 1, the VUTP corrective circuitry and twisted pair links connect the Telco POP to an adaptive/optical signal transmission/reception sources referred to as customer premises equipment. The adaptive/optical signal transmission/reception source at or near the home sends and receives the signals over twisted pair within the homes. The adaptive/optical transmission and reception sources are further described below.

Example adaptive transmission schemes are described in U.S. Pat. Nos. 6,412,989, Hartman et al., and 7,155,134, K. Azadet, the contents of which are both hereby incorporated by reference.

In another embodiment of the present invention, such as cases where the homes are not in a line of sight to the roof or pole mounted adaptive devices, a Wi-Fi or WiMax implementation may be used to deliver the content to the home using the power or light poles to mount the wireless devices thought out the service area.

Figure 2:
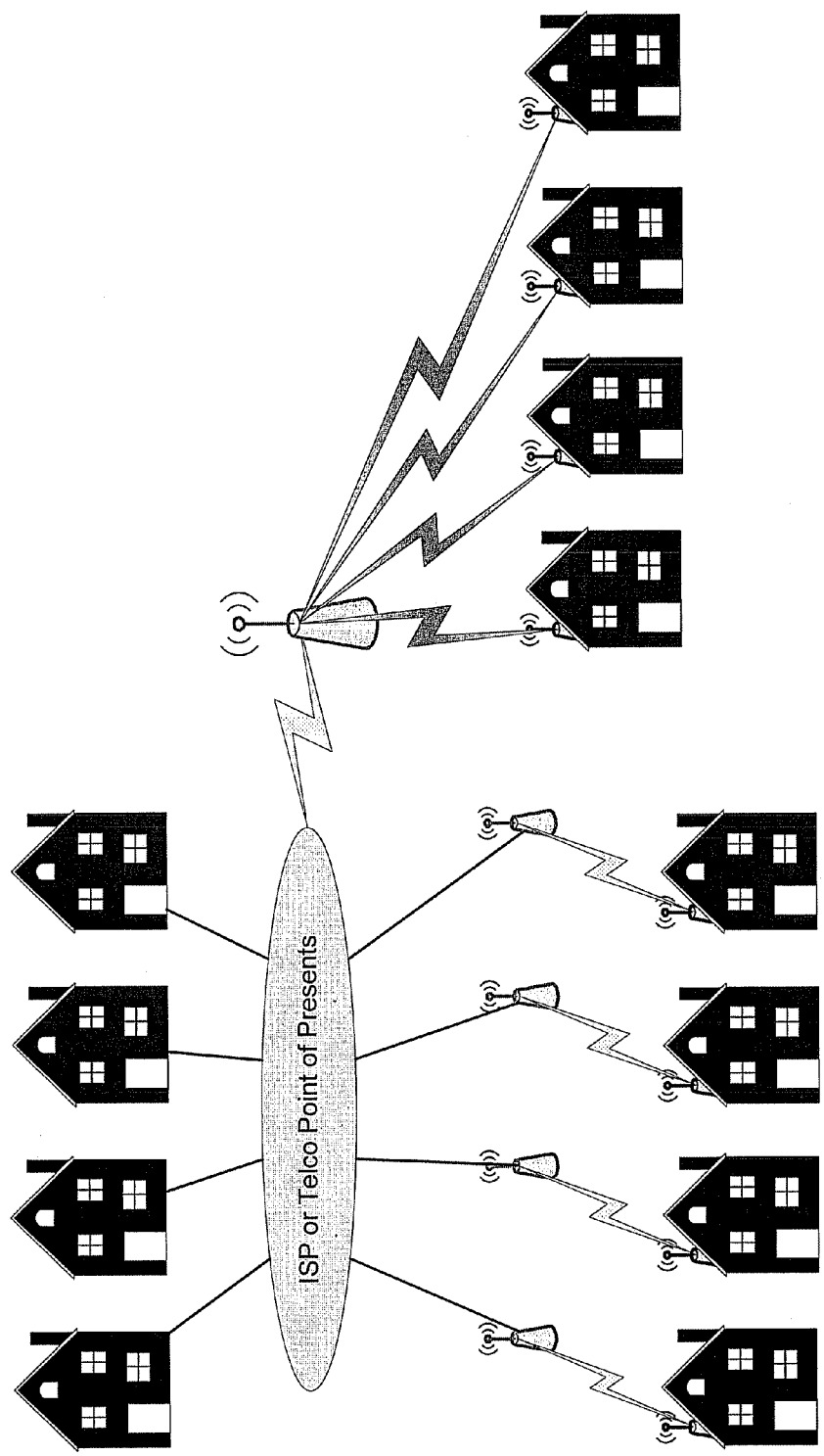
FIG. 2. is a diagram showing transmissions in a residential environment as in FIG. 1, and also using a wireless access point according to an embodiment of the present invention.

It is noted that the lightening bolts on right most side of FIG. 2 represent using Wi-Fi/Wimax to bring the VUTP technology to the customers' home using an Access point connected to the existing twisted pair wiring and using the optical transmission as a back haul to the POP/ISP which is managed by a parallel based command authority managing an adaptive optical transmitter.

In FIG. 2, VUTP corrective circuitry and/or twisted pair copper wire are preferably installed within each of the homes in FIG. 2, as is typical in most communities in this country. Homes on the upper left are preferably connected with the Telco POP over VUTP links that is over twisted pair wires with VUTP corrective circuitry. In the lower left homes, VUTP links connect the Telco POP and optical/adaptive signal transmission/reception sources, and also connect the adaptive/optical transmission/reception source with twisted pair wires within the homes.

Figure 3:
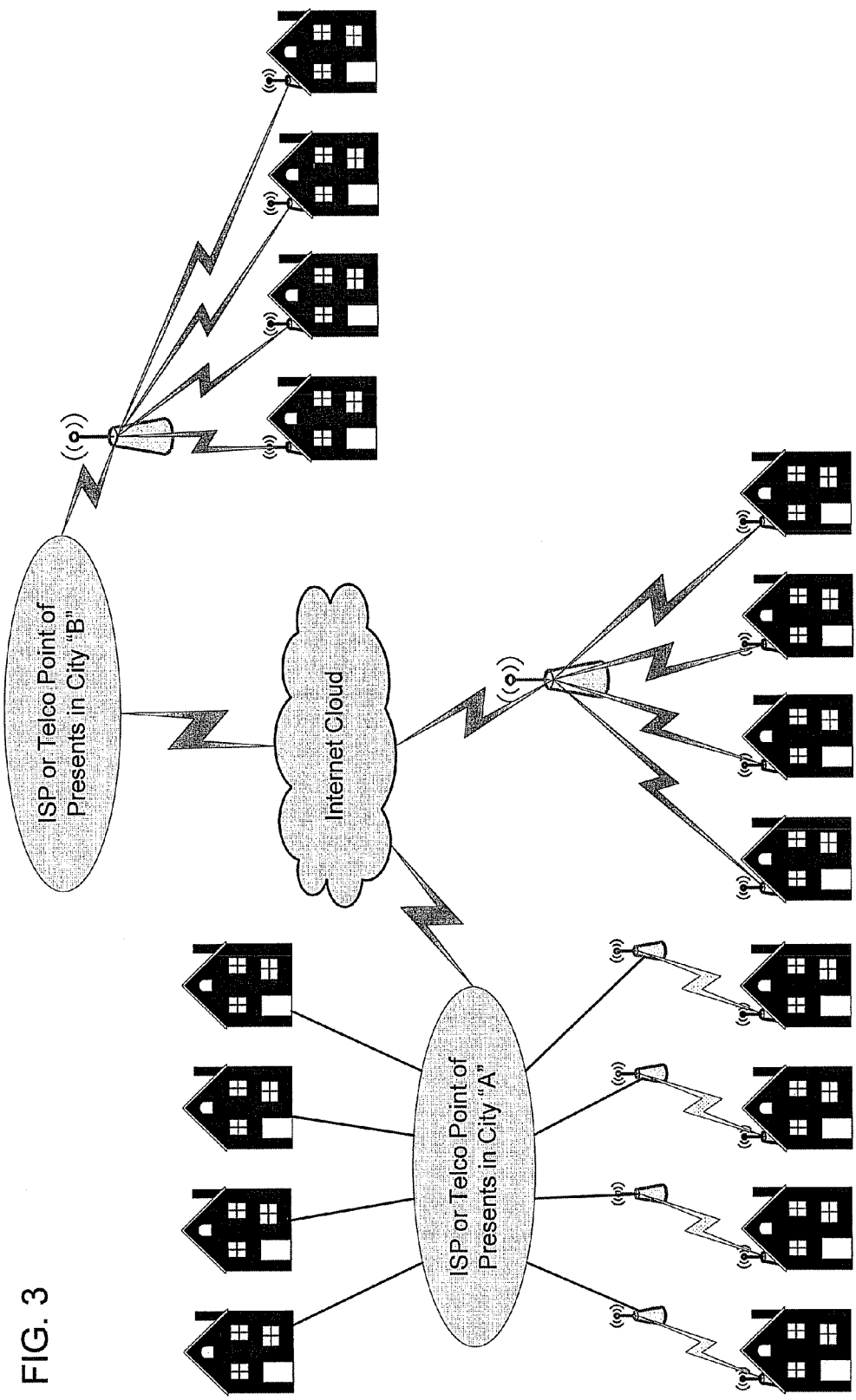
FIG. 3 is a diagram showing transmissions in a residential environment as in FIGS. 1 and 2, and also using the Internet and two ISPs or Telco points of presence in cities A and B according to an embodiment of the present invention.

In FIG. 3, VUTP wire exists in each of the homes. VUTP wire also connects the Telco POP with the (1) community at the top left, and (2) the adaptive/optical signal transmission/reception sources at the lower left.

The Optical Technology is a "Layer one" protocol. Layer one receives frames or data from higher layers and communicates such frames or data between points in a communication, such as communications between devices, Hubs and/or Repeaters.

When a protocol at the physical layer receives information from the upper Layers through IT based software from any number of vendors; it translates all the data into signals that can be transmitted on a transmission medium. This is called Signal Encoding. That is, the ones and zeros of data are converted into electrical on-offs by the physical layer protocols.

Using VUTP technology with a straight Optical to Adaptive or any combination of the above methods in a Mesh configuration will increase the bandwidth available to the consumer and provide a flexible delivery mechanism for the provider of content at a significant reduction in cost, and most importantly, give the consumer the access to all IT data computing, security, and facilities management services on the same infrastructure which is being preserved from failure by having the consumer receive and give commands to the network on a parallel computing basis.

Hybrid Communications Network

Figure 9:
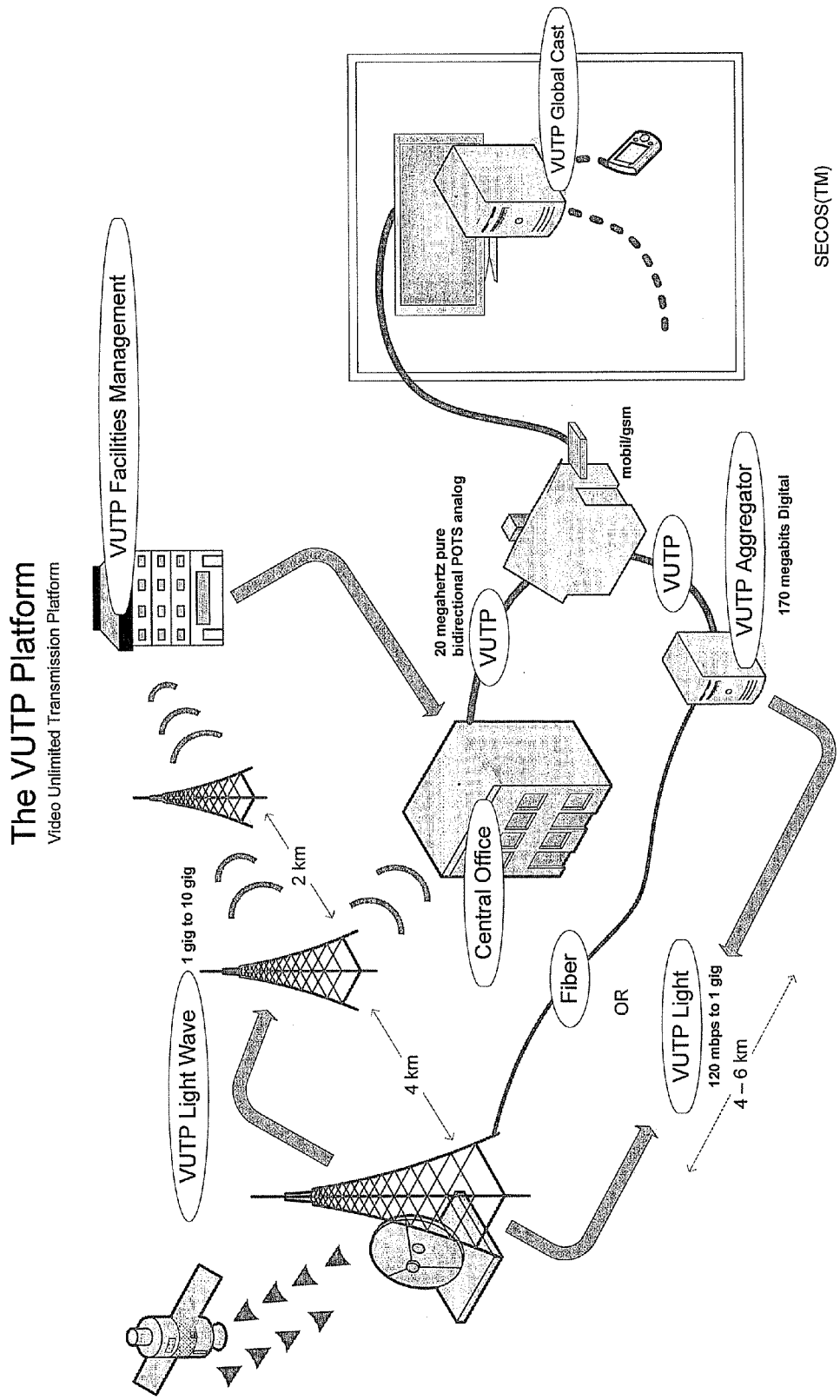
FIG. 9 is diagram showing the VUTP platform according to an embodiment of the present invention.

FIG. 9 illustrates a system providing a hybrid communications network that utilizes a combination of VUTP circuitry and optical and/or adaptive transmission links working with an aggregator for a number of electronic equipment devices connected to the network. The VUTP circuitry and the hybrid network have applications to both residential and commercial buildings and residential communities, which already have extensive existing twisted pair wiring.

An embodiment of the invention provides a system that will take an optical signal and convert it to an analog signal while producing longer range capabilities and/or throughput for telecommunication equipment, the security equipment, the IT/Data systems as well as all facility controls (i.e., lighting, fire alarms, environmental temperature HVAC, and mechanical equipment) which may be native to the building or the home residing with or without internet protocols within the facility.

The improvement focuses on transforming an optical signal to an analog signal and then implementing a corrective impedance circuitry to the copper wire over which the signal travels, allowing for improved throughput that enhances the facility control system being utilized to send and receive higher value video voice and data transmissions from any or all of the associated electronic equipment which resides in the home or building and/or extend the range of control over the overall system.

All communication systems and Security Services today provide an adequate service for defending against the specific threat they are designed to address. The real vulnerabilities exist in the gaps between these services which occur because there has been no system designed today which "bridges" those systems on a parallel basis utilizing the existing infrastructure of copper tied into an adaptive optical wide area delivery to scale on a citywide or national basis. The most glaring gap is between management of users' access to physical security devices (i.e. the doors, alarm systems, perimeter monitoring devices, etc. . . . ) and the logical resources (applications, databases, accounts, etc. . . . ) they need to perform their job.

When the security posture at a facility is raised, currently no one can be assured that an individual no longer has access to certain sensitive physical locations as well as perhaps more restricted access to sensitive data in the form of video, voice or data. Or alternatively, that the right people have more access to certain parts of the facility and more access to sensitive information. And, perform this quickly and in a coordinated fashion.

To truly protect these precious assets, an organization needs a management approach which can manage across all of the disparate devices, applications and resources as well as address this existing gap between the management of the physical and logical realms. The VUTP Hybrid solution provides this management approach.

Security Integration

Any new or existing facility represents a unique opportunity to begin to implement management of both physical resources and logical systems with the same security policies, and the ability to react to changing threat postures in a consistent manner across both these realms.

This is the original vision of the internet. However, its inability to fundamentally be able to scale without massive economic consequences (not being parallel based) has limited its effectiveness to create wide spread adoption beyond being used for service applications which do not interface with electrical systems that have no IP protocol. As these number in the hundreds of millions globally), such capability would give the user the ability to manage more than just the smart card.

Accordingly, VUTP HYBRID can provide a comprehensive capability to manage an identity across all resources, both logical and physical, and restrict them from the resources they should not be able to access. VUTP HYBRID can provide a comprehensive Identity and Access Management solution which has the ability to extend into the management of the physical resource managed by the Integrated Controls solution.

For example, in the event of a higher security threat level, there will be a need to lock down locations as well as logical access to systems. With the integrated Control VUTP HYBRID management approach, both the physical and logical systems can now be managed to reflect the posture change based upon the security posture.

Auditing.

The success of this management approach is also dependent upon the ability to be able to audit security actions and report anything that is out of compliance. For example, if an individual is determined to be a risk, both the physical and logical resources need to be deprovisioned immediately, and an audit of all relevant security actions needs to be available.

Federation.

Provide the ability to collaborate across multiple federal agencies, emergency response organizations (i.e. Fire and rescue, Police) and comply with the e-Authentication initiatives.

Federated Web services

Federated Web services provide shared data with other agencies.

Trusted Identity.

On a real time basis, intrusion detection can be alerted and passed up to higher level management dashboards.

The system assists in complying with requirements by allowing for the saving of data for 5 years and allowing for the mining of data for fraud and unauthorized data access (or physical access, where audit data is available.)

The system can manage the IDs across all of the systems including the physical and logical access systems. This addresses a real problem with managing changes and removals.

Single sign on-across all logical resources to include Web, fat client, mainframe, etc., is also provided.

Common Criteria Certified

The VUTP HYBRID service management platform will provide a dashboard of all relevant information on the availability of the Security Service including:

Management of events from a global threat perspective. The ability to manage events from a multitude of sources be it physical or IT based systems, both internal and external (i.e. web weather events) and correlate the information and function as a Manager of Managers.

Alerting of hardware failures such as cpu overheating, hard drive failures, fan failures etc.

Proactive management of sequel databases used for managing the Operations Center. This will allow DHS to be informed of table space and buffer issues, for example, before they become a problem.

Proactive monitoring of the operating systems, identifying problems with all aspects of the system including logical drive space, memory usage, cpu utilization etc.

Capacity Management

A data warehouse is kept with all of the performance and capacity information so that intelligent planning can be performed for the resources supporting the service.

Management of the Network

Management of the network includes:

Identifying network issues that could impact the delivery of information around security breaches.

The ability to automate workflow processes based on the correlated events from a threat perspective is essential to proactive monitoring and cost reduction.

Management of events from a global threat perspective, being able to pull events from physical and other events that happen from external related sources such as the web weather events, etc.

Identification of failover in the event of a hardware failure.

Backup and Recovery

The system provides backup and recovery with emphasis on speed to recovery in the event of data loss and comprehensive storage management.

Dependency Discovery/Configuration Database

The management system will also discover all of the interrelated IT components that support the system and keep track of relationships and dependencies between them. This includes software dependencies, such as, for example, dependencies of the SECOS kernel which is dependent on the SQL database and dependencies such as which table space to utilize.

The configuration of the interrelated IT components are collected and can be utilized for auditing the system and also be utilized from a compliance perspective in regards to maintaining a gold standard to compare against.

Change Management

The majority of service interruptions are self-inflicted. Change management processes will leverage the Configuration database, so that changes to IT components supporting the service are done within the context of the related dependencies. For example, when a table space is taken offline or reorganized, we understand that it is supporting the SECOS kernel and that the activity is done in such a way that will not compromise security at the facility.

Service View/Manager of Managers

The solution functions as a manager of managers to provide a comprehensive view of all aspects of the service integrating information from multiple complementary management systems.

The solution provides for integration of information from other data sources to enrich the event so that it has more meaningful management and security information. For example, when an outage occurs an event comes in with generic information about the system. The event could be enriched to include information about the administrator responsible for that system, the users impacted, information about the configuration of the system, etc.

The computers and networks that support the Facility Security Service should be viewed not just as a collection of disparate components, but rather, as a single entity with interrelated components.

A dashboard will be provided which shows all of the components such as the system hardware, the routers, the databases, web servers and most importantly how they are related.

The dashboard can also include KPI's related to the service such as unauthorized access to different locations so that patterns can be detected, etc.

The Service View is built using the central CMDB that has all of the relationship and CI information for the service.

Green

The solution will also support Green Initiatives. The combination of VUTP HYBRID hardware and software will allow the systems to be cycled down during periods of low utilization to reduce the power requirements of the service.

Asset Management

Assets related to the service will comprise both IT and non-IT assets. IT assets such as the computers, switches, etc are tracked. In addition the system can manage the cameras, the locks, sensors, cardreaders, etc that are associated with physical security. This is a unique capability of the combined Integrated Controls NUTP HYBRID solution.

Assets are tracked with financial information and quantity on hand so that replacements components are assured to be available in the event of a failure of a physical security component. The system can also manage the operators of the asset and their training/certification.

VUTP HYBRID's asset management solution has been used to maintain systems from aircraft maintenance to nuclear power plants. It is unique in its ability to transcend traditional IT asset management and integrate it with non IT asset management. In solutions such as security, this becomes important as certain components in physical security span IT and non-IT categorization. A card reader on a door is a perfect example. It might be IP addressable, yet it is controlled as a physical asset.

This system will also have the ability to manage linear assets such as roads, cable systems and boarders. It can also manage the asset and events on a linear basis.

Today, industry is focused on converting optical signaling to digital formats such as Ethernet, ATM, etc. Embodiments of this invention, however, take an optical signaling sequence and convert it to an analog signal in order to improve the range and/or throughput capabilities for electronic equipment operating without a facilities management authority. This has not been achievable without having to replace all equipment with "smart" or "intelligent" networks and equipment which require having an internet protocol device built into its logic.

The invention addresses the need for mass communication of analog devices with digital devices, allowing that bridge between "intelligent" networks and legacy mechanical controls which operate with ICC protocols over long distances in both a wire line and a wireless manner. The inventions also satisfy the requirement for full motion real time video and data, in which known technologies can not overcome latency issues in handling multiple commands to and from electronic systems which are not interoperable across the entire G/S stack.

An object of the disclosed invention is to provide the means to convert an optical signal (wireless) to an analog signal in a manner that generates real time information within the copper wiring used in today's telecommunications industry and extend that authority across the IT/Data and Security equipment not just communications and television signals.

Embodiments of the disclosed invention provide unique implementations and conversions from IT Data management systems to Facilities Control Management System protocols which are not dependent on IP protocols for agnostic management. The optical to analog signals being utilized through existing facility control systems which have no ability to combine the facility controls with the authority of IT/Data and software intelligence on an agnostic basis without prejudice to manufacturer. The system preferably includes an optical transmitter and receiver, and incorporates an FVUTP (e.g., FDDI to VUTP converter) for optical to analog conversion utilizing an optical transmitter and an optical light-diode for receiving and utilizes a scalable electronic control operating system using parallel computing architectures on the Dynamic Spectrum Allocation channels to bridge IT Data Systems and Security and Facilities Management capabilities into one "Hybrid" authority. The system improvements allow for longer range and/or improved throughput and by use and means of parallel computing architectures, enables that authority to bridge national and international physical boundaries' and scale on a massive parallel basis.

Once the optical signal is received, an optical to analog conversion is performed, which allows for real time information (data) to be distributed within the traditional copper wiring system at greater range and/or throughput.

Figure 4:
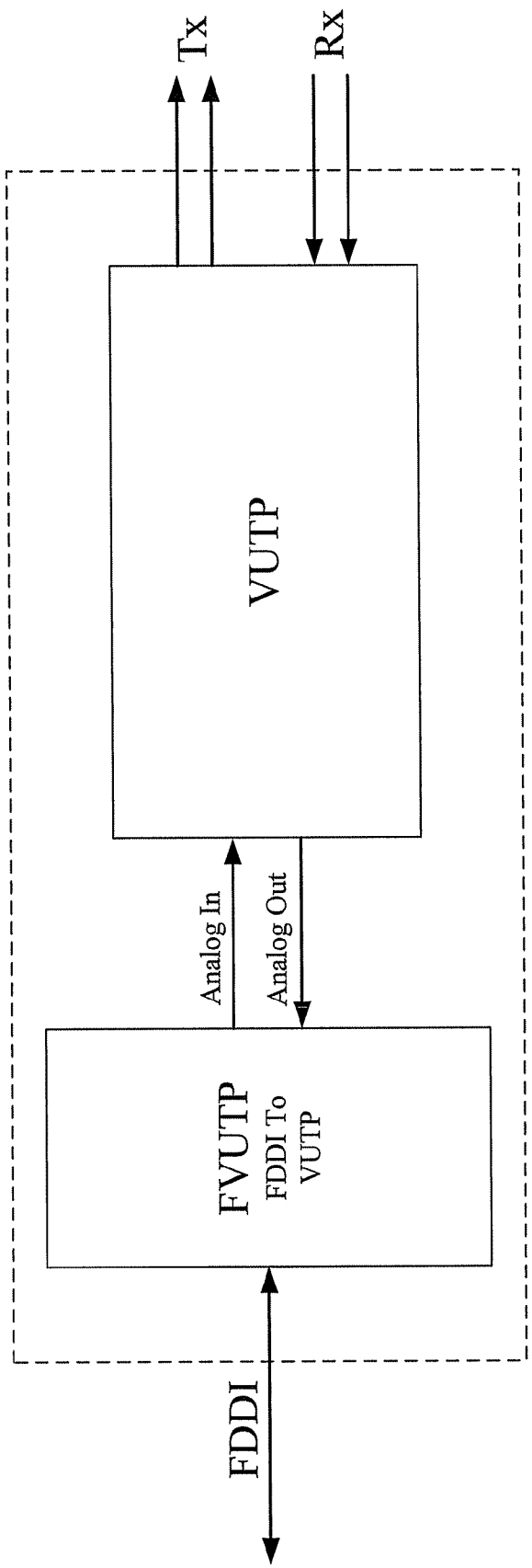
FIG. 4 is a diagram showing a fiber interface connecting to a unique FVUTP converter according to an embodiment of the present invention.
Figure 6:
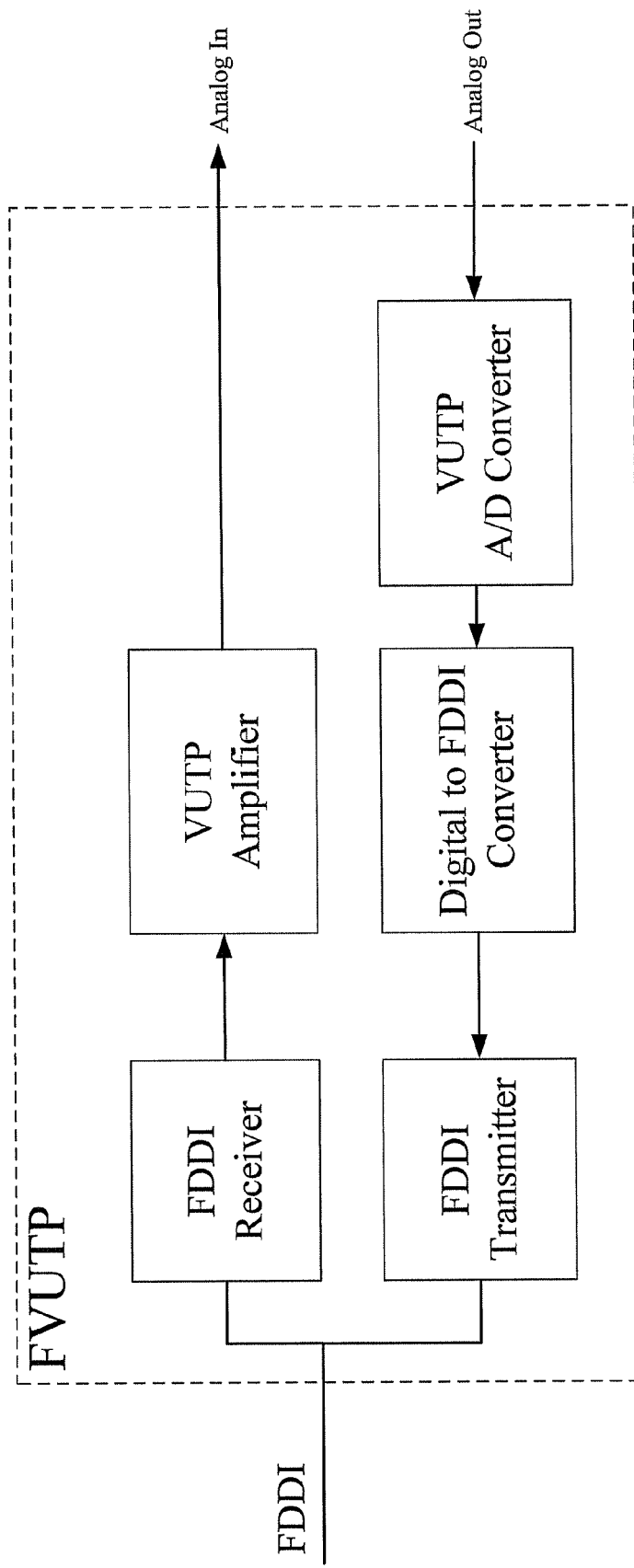
FIG. 6 is a diagram showing an amplifier, receiver, transmitter embedded in the FVUTP converter according to an embodiment of the present invention.

Referring to FIG. 4, a fiber (FDDI) interface connecting to a unique FVUTP (FDDI to VUTP) converter is shown. The FDDI receives an optical signal and converts it to a single ended analog signal, which then is processed by the VUTP block. The FVUTP is preferably embedded with the appropriate amplifiers, as illustrated in FIG. 6, which generate VUTP and the input signal to the VUTP circuitry. The internal VUTP circuitry (the details of which are incorporated by reference from the VUTP OBW application) within the FVUTP enables the conversion to the corresponding VUTP technology.

The amplifier in the VUTP circuitry is set with a sufficient bandwidth to accommodate the VUTP technology system, for example. The amplifier or other signal correction means of the VUTP circuitry are thus operable to correct the signal for further transmission over twisted pair wires. The VUTP circuitry receives and transmits signals TX and RX as further described in the VUTP OBW application In a similar manner, an RX signal is generated as analog out from the VUTP circuitry to the FVUTP. The analog out interface on the FVUTP has an internal analog to digital converter, which receives the analog VUTP signal, and processes the signal. The converted digital signal is then sent over the FDDI transport.

Figure 5:
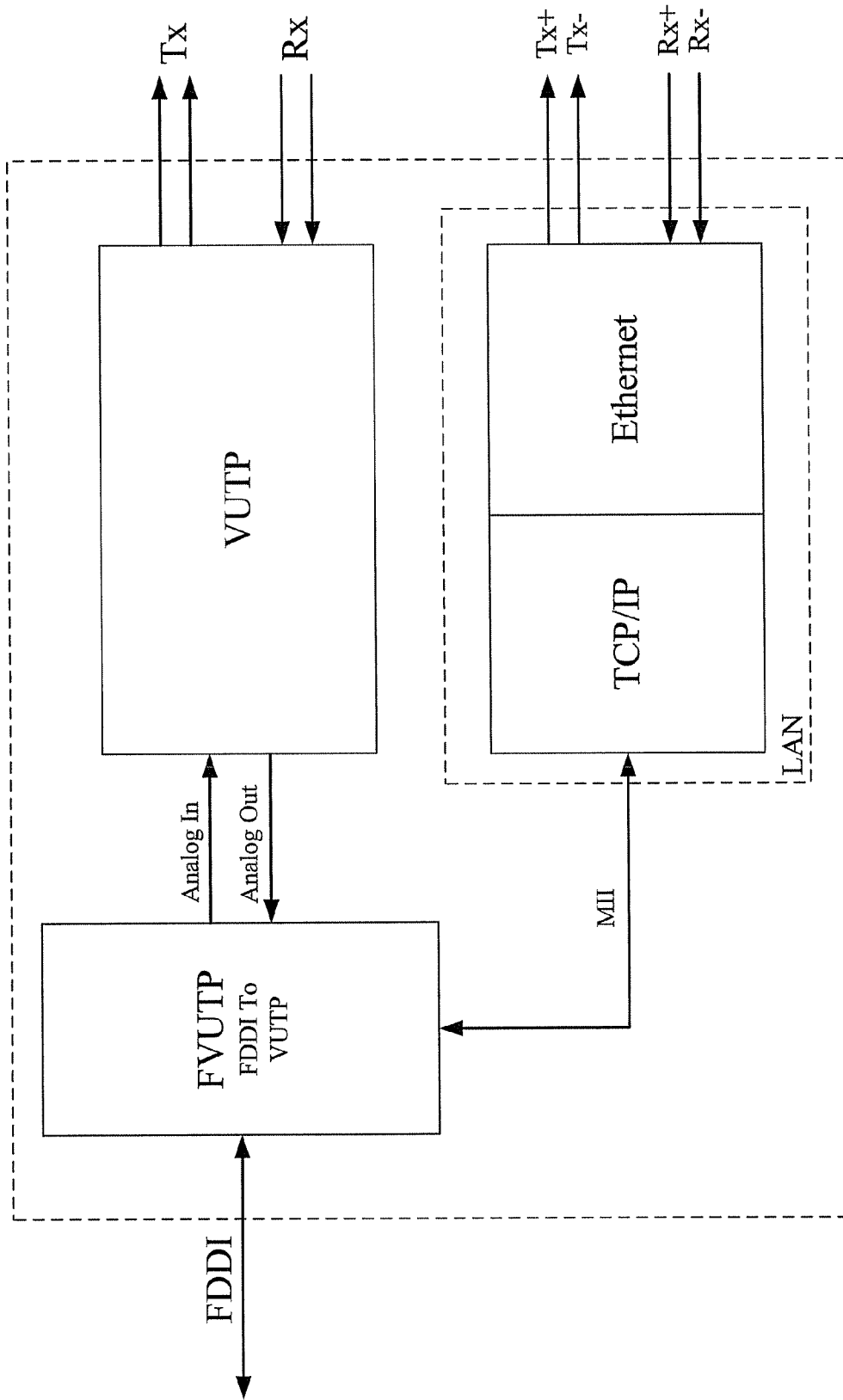
FIG. 5 is a diagram showing a fiber interface as in FIG. 4, and also with the ability for the system to communicate with traditional Local Area Networks according to an embodiment of the present invention.

FIG. 5 includes similar elements disclosed in FIG. 4 and FIG. 6 and adds the ability for the system to communicate with traditional Local Area Networks "LAN" using existing 10/100 Base Ethernet technology and "Dry Pair" non-Ethernet both of which are based and run on existing twisted pair telephone wire of various categories without limitation. The architecture allows current and legacy systems to operate with the VUTP technology. For adaptability, a Facility Commander Facility Management system or SECOS (Scalable Control Operating System) interface is preferably used to connect the disclosed system to external transceiver devices. In this way, several million types of devices including RF, Adaptive Optical, adaptive, IT data systems, content management systems, electrical and mechanical, and security as well as facilities systems having a various physical layer connections can be interconnected without redesigning or replacing the disclosed hardware—thereby allowing them to be scaled by the tens of thousands. This can allow delivering Real-Time analysis and video by establishing direct intelligence with various software based authorities, which have traditionally been only able to communicate between intelligent computers, but have not been able to extend down to sub-system electronics which are rationally inherited in homes and buildings around the world.

FVUTP Diagram

Referring to FIG. 6, the FVUTP preferably includes an FDDI Receiver, VUTP Amplifier, FDDI Transmitter, and Digital to FDDI converter, and VUTP Analog to Digital Converter. The FDDI Receiver and Transmitter comprise a fiber optical transmitter and an optical diode receiver. When a FDDI received signal is detected, the VUTP amplifier processes the electrical signal and amplifies the amplitude within the constraints of the VUTP technology connected by the "Analog In" line. The amplitude and bandwidth associated with the VUTP amplifier correlate to the VUTP technology block to allow for a proper matched system.

The FDDI transmitter is driven by digitized signaling from the VUTP's A/D converter, wherein the signaling is driven by the "Analog Out line." The VUTP A/D converter takes the signaling from the VUTP technology and digitizes the signal in order to have the Digital to FDDI converter process the signal for the FDDI Transmitter.

Figure 7:
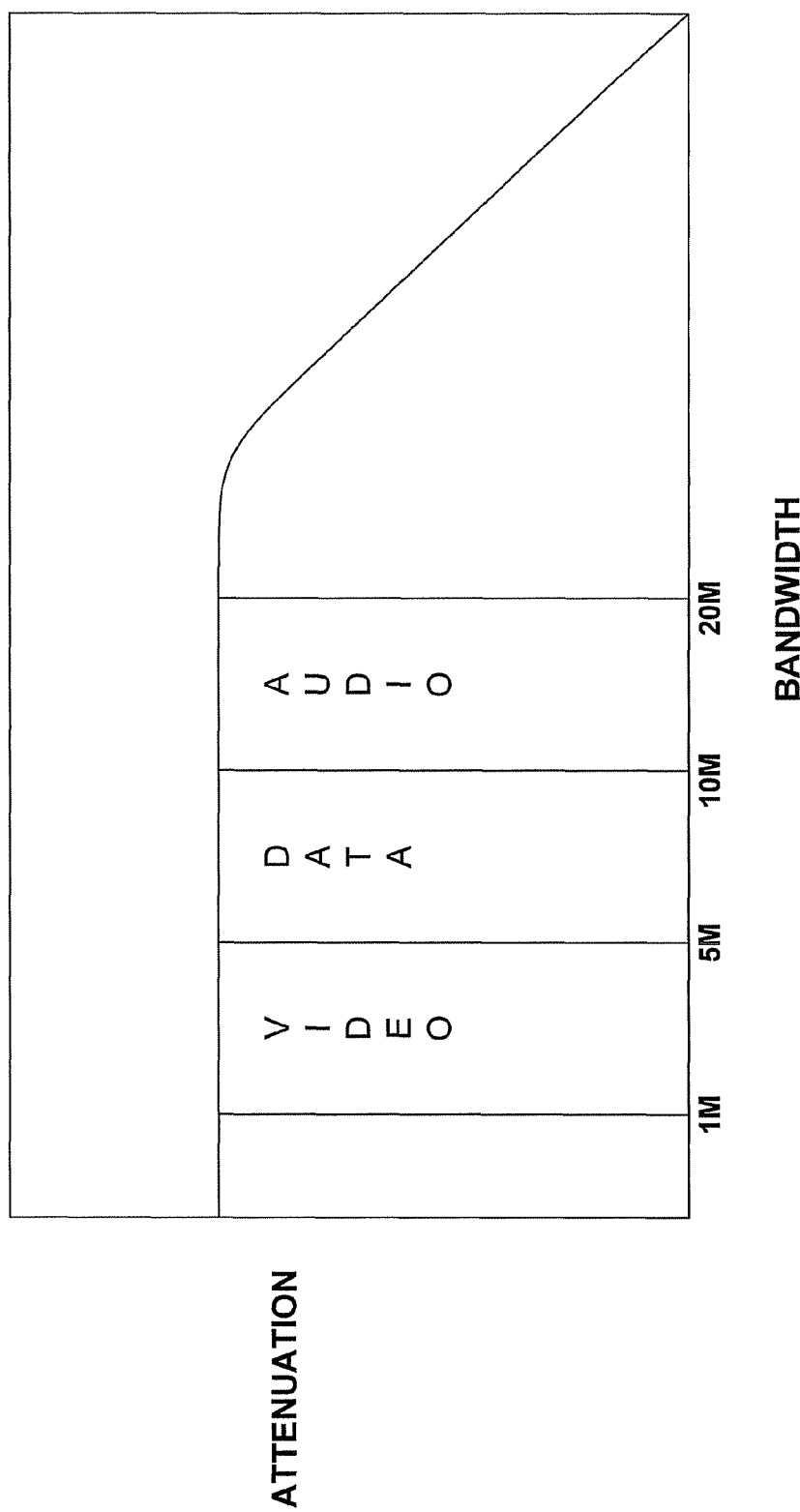
FIG. 7 is a diagram showing an allocation of bandwidth for particular types of services according to an embodiment of the present invention.
Figure 8:
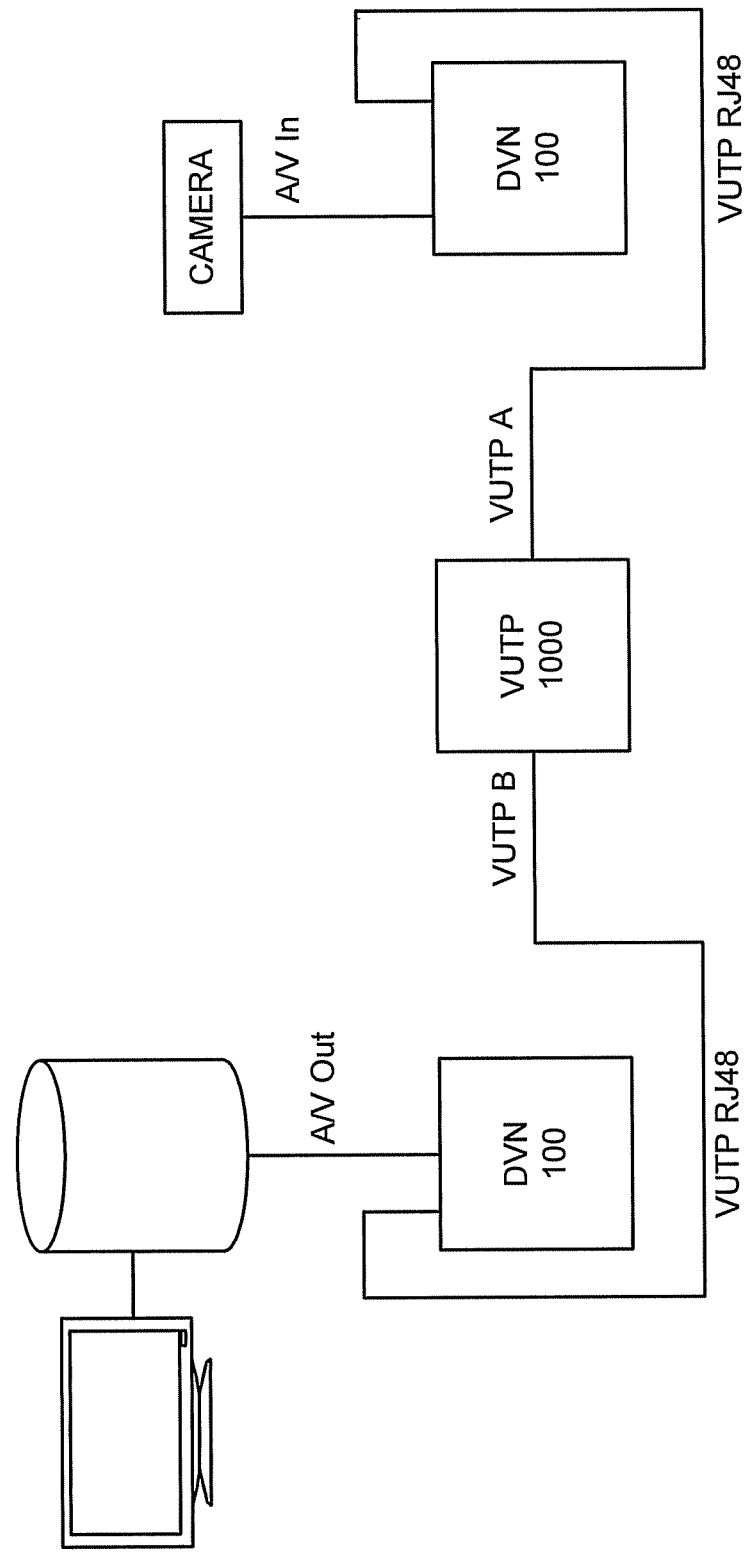
FIG. 8 is a diagram showing an exemplary implementation using a media server to deliver video on demand according to an embodiment of the present invention.

FIG. 7 illustrates the system's ability to dynamically allocate bandwidth for a particular type of service. Although only video, data, audio services are shown in FIG. 7, one of skill in the art will appreciate that any other type of service including the combination of existing off-the-shelf software for IT data management systems coupled with Facility Management Systems of various suppliers on a completely interoperable basis, can be supported by communications networks which may also be dynamically allocated as described herein.

In the novel system, bandwidth may be assigned based one or more factors such as the type of services available, customer service demands, and quality of service requirements. As discussed below, the dynamic assignment of bandwidth provides a host of benefits heretofore unavailable in communications networks.

In an embodiment of the present invention, one type of service transmission may require greater or lesser bandwidth than another service type. For example, video may require greater data throughput than data or audi; Security Video may require being prioritized over Cable Television; Stereoscopic Holograms may require greater ranges of bandwidth allocation than traditional HDTV or NTSC; and access control video monitoring fire hazards and event notifications related to mechanical or electrical failure and threats may require more or less bandwidth.

Accordingly, the system is configured to dynamically allocate more or less bandwidth for video than for data and audio based on the needs established through the protocols written into the software at the applications layer, which by means of this platform, may have the ability to dynamically allocate commands to the system and subsystem level of existing hardware within the facility. In this manner, the system ensures that the throughput requirements for each service type are satisfied and the authority is extended to all class of IT systems, software architectures, communication systems, and all ICC electrical systems on an agnostic basis.

In still a further embodiment of the present invention, Quality of Service ("QoS") needs to provide for a certain bandwidth allocation. That is, a defined QoS may be required for certain types of network traffic. For example, streaming multimedia may require guaranteed throughput to prevent playback from starving. Also, security systems may require a specific QoS to ensure alarm signals are timely propagated across the network. In another example, safety-critical applications, such as remote surgeries performed by health care providers, may require a guaranteed level of availability not only to be seen, but to be given command and control over the electronic devices which are being seen by the cameras or in receipt of instructions from IT Data Software programs from multiple vendors, These types of services are known in the art as inelastic because any more bandwidth than required is unused, and any less will render the service nonfunctioning.

In this embodiment, the system is configured to dynamically assign the necessary amount of bandwidth so that the each type of service functions according to its QoS requirement.

Example dynamic spectrum allocation technologies are described in the VuTP DBW App.

TCP/IP and UDP signaling may also be used in combination with VUTP circuitry. Exemplary VUTP circuitry may be appreciated as follows: a first DVN unit converts a video signal to a VUTP compensated video signal over, e.g., a 4.5 MHz bandwidth; the video signal is injected into the VUTP circuitry units via a video port using an NTSC type format; the compensated VUTP video signal is then received by a second DVN unit over a twisted pair, processed, and then the signal is broadcasted on a monitor. It is desirable to inject a TCP/IP format signal over the video in port on the DVN.

FIG. 5 illustrates an exemplary implementation. A media server (e.g., cloud computer) may be used to deliver video on demand, The media server may be connected to a DVN by, e.g., an s-video port or s-video to RCA cable converter or DVN. The second DVN unit may also receive and transmit a camera image to the media server (as well as receiving signals from a DVN).

This configuration can demonstrate porting over NTSC signaling to a Media Server from DVN units.

FIG. 9 illustrates an exemplary embodiment of a VUTP communications network.

Although the present invention and its advantages have been described in detail, it should be understood that various changes, substitutions and alterations can be made herein without departing from the spirit and scope of the invention.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform' substantially the same function or achieve substantially the same result as the corresponding embodiments described herein may be utilized according to the present invention as those which are attached herein.

We claim:

1. A method of providing communications over a hybrid communications network to a plurality of geographically separately located facilities each having a pre-existing network of conventional twisted pair wire with minimal retrofit requirements, the method comprising the steps of:

configuring a hybrid communications network to provide a network connection between a point of presence for a service provider and each of a first plurality of facilities over a corresponding first plurality of unshielded twisted pair wires defining a first plurality of twisted pair links extending between the point of presence and the corresponding first plurality of facilities, each facility of the first plurality of facilities including central premises equipment configured to receive and transmit data over an associated dedicated one of the first plurality of twisted pair links connected between the first plurality of facilities and the point of presence and configured to receive and transmit data over on-premises twisted pair wire pre-existing within the respective facility, the point of presence located remotely from each of the first plurality of facilities and including point of presence equipment configured to receive and transmit data over each of the plurality of dedicated twisted pair links, a distance between the point of presence and each separate one of the first plurality of facilities being within a preselected range;

configuring the hybrid network to provide a network connection between the point of presence and each of a second plurality of facilities over a corresponding plurality of hybrid links extending between the point of presence and the corresponding second plurality of facilities; and each hybrid link comprising one of a second plurality of twisted pair links and one of a plurality of alternative communication links comprising one or more of the following: an adaptive network link and an optical network link, and comprising twisted pair link-to-adaptive network link connection equipment defining a respective intermediate connection node, each facility of the second plurality of facilities including central premises equipment configured to receive and transmit data over an associated dedicated one of the plurality of hybrid links connected between the second plurality of facilities and the point of presence, and configured to receive and transmit data over on-premises twisted pair wire pre-existing within the respective facility, the point of presence located remotely from each of the second plurality of facilities and including point of presence equipment configured to receive and transmit data over each of the plurality of dedicated hybrid links, a distance between the point of presence and each separate one of the second plurality of facilities substantially exceeding the preselected range.

2. A method as defined in claim 1, further comprising the step of:

connecting each intermediate connection node to a separately located existing vertical member, the vertical member comprising one or more of the following: a pre-existing telephone pole, a pre-existing lighting pole, a roof of a pre-existing adjacent facility, and a pre-existing tower, the associated one of the second plurality of twisted pair links extending between the respective intermediate connection node and the corresponding point of presence equipment, the associated one of a plurality of alternative communication links extending between the respective intermediate connection node and the central premises equipment located at the corresponding one of the second plurality of facilities.

3. A method as defined in claim 1, further comprising the step of:

configuring the hybrid network to provide a network connection between the point of presence and each of a third plurality of facilities over a corresponding plurality of optical-wireless links extending between the point of presence and the corresponding third plurality of facilities, each optical-wireless link comprising a common optical link extending between the point of presence and a common optical-wireless connection node configured to provide a separate wireless connection to each of the third plurality of facilities, each facility of the third plurality of facilities including central premises equipment configured to receive and transmit data over the wireless connection with the optical-wireless connection node, and configured to receive and transmit data over on-premises twisted pair wire pre-existing within the respective facility, and the point of presence located remotely from each of the third plurality of facilities and including point of presence equipment configured to receive and transmit data over the optical-wireless links.

4. A method as defined in claim 3, further comprising the step of:

connecting the common optical-wireless connection node to a separately located existing vertical member, the vertical member comprising one or more of the following: a pre-existing telephone pole, a pre-existing lighting pole, a roof of a pre-existing adjacent facility, and a pre-existing tower, when at least one of the third plurality of facilities is not in a line of sight to a desired connection point on the vertical member.

5. A method as defined in claim 1, wherein the distance between the point of presence and each separate one of the second plurality of facilities prohibits use of digital line subscriber and asymmetric digital line subscriber technologies over the second plurality of twisted pair links.

6. A method as defined in claim 1, wherein each central premises equipment comprises Video over Unshielded Twisted Pair copper wires ("VUTP") circuitry configured to provide transmission of a plurality of different signals, the plurality of different signals including video, telephone, and data signals multiplexed together and transmitted simultaneously over the same twisted pair link utilizing a plurality of transmission frequencies, the VUTP circuitry comprising:

a transmitter and receiver combination configured to operate at a transmission frequency above 2 MHz over conventional twisted pair wire;
a frequency bandwidth allocator configured to dynamically allocate a plurality of discrete bands of transmission frequencies for communication transmission over conventional twisted pair links based upon one or more of the following: type of service, data transmission demands, and quality of service guarantees; and
an amplifier comprising amplification and impedance matching circuitry, whereby the signal degrading effects of the impedance of a twisted pair link are reversed by the amplification and impedance matching circuitry, greater signal amplification being provided to higher frequencies than to lower frequencies, the amount of application adjusted in response to a distance of signal travel.

7. A method as defined in claim 1, wherein the on-premises twisted pair wire includes at least one twisted pair wire defining a common twisted pair wire connected to television video, Internet, and telephone service equipment, and wherein the method further comprises the step of:
multiplexing a plurality of different types of service data on the common twisted pair wire, the plurality of different types of service data comprising television video, Internet, and telephone service data, each type of service data having different spectrum allocation settings and protocol sequencing.

8. A method as defined in claim 1,
wherein the central premises equipment for each facility of the second plurality of facilities is operably coupled to a plurality of different types of equipment;
wherein the on-premises twisted pair wire comprises a two-wire twisted pair forming a channel;
wherein the central premises equipment includes a transmitter connected to a first wire of the two-wire twisted pair forming the channel and a receiver connected to a second wire of the two-wire twisted pair; and
wherein the method further comprises: dynamically allocating discrete frequency bands over the first wire of the two-wire twisted pair forming the channel to optimize available channel bandwidth utilization.

9. A method as defined in claim 8, wherein the step of dynamically allocating discrete frequency bands comprises:
determining a distance a signal will travel over the first wire of the two-wire twisted pair, physical properties of the first wire of the two-wire twisted pair, and current service demands of each piece of equipment of the plurality of different types of equipment to define utilization characteristics; and
performing the dynamic allocation responsive to the utilization characteristics.

10. A method as defined in claim 8, wherein the step of dynamically allocating discrete frequency bands comprises:
assigning a discrete frequency band responsive to one or more of the following utilization characteristics: type of services available, customer service demands, and quality of service requirements; and
adjusting the assigned frequency band in response to a change in one or more of the following utilization characteristics: the type of services available, the customer service demands, and the quality of service requirements.

11. A method as defined in claim 1, wherein the on-premises twisted pair wire includes at least one twisted pair wire defining a common twisted pair wire connected to equipment requiring a plurality of different service types, and wherein the method further comprises the steps of:
assigning each of the plurality of different service types to a corresponding plurality of discrete frequency bands for transmission over the common twisted pair wire;
employing control signals to initially configure frequency allocation assignments for each of the plurality of different service types;
identifying signal degradation resulting in a reduction in quality of service below a threshold value for one of the plurality of service types; and
dynamically reassigning a frequency range for transmission of a signal associated with the one of the plurality of service types experiencing signal degradation from a first prior assigned frequency range to a second assigned frequency range.

12. A method as defined in claim 1,
wherein the central premises equipment for each facility of the second plurality of facilities is operably coupled to a plurality of different types of equipment, the different types of equipment comprising video, audio, and data signal producing equipment;
wherein the on-premises twisted pair wire comprises a plurality of two wire twisted pairs forming a plurality of separate channels;
wherein the central premises equipment includes a plurality of transmitters each separately connected to a first wire of a pair of wires forming one of the plurality of separate channels, and a plurality of receivers each connected to a second wire of the pair of wires forming one of the plurality of separate channels; and
wherein the method further comprises:
determining a desired range of frequencies for transmitting a signal,
determining frequency spectrum availability of the first wire each of the plurality of channels, and
selecting one of the plurality of transmitters connected to the first wire of one of the plurality of channels from among the plurality of channels having frequency spectrum availability sufficient to support the desired range of frequencies for transmitting the signal.

13. A method as defined in claim 1, wherein each of the second plurality of twisted pair links includes at least one twisted pair wire defining a common twisted pair wire, and wherein the method further comprises the step of:
multiplexing a plurality of different types of service data on the common twisted pair wire, the plurality of different types of service data comprising television video, Internet, and telephone service data, each type of service data having different spectrum allocation settings and protocol sequencing.

14. A method as defined in claim 1,
wherein each of the second plurality of twisted pair links comprises a two-wire twisted pair forming a channel;
wherein the point of presence equipment includes a transmitter connected to a first wire of the two-wire twisted pair forming the channel and a receiver connected to a second wire of the two-wire twisted pair; and
wherein the method further comprises: dynamically allocating discrete frequency bands over the first wire of the two-wire twisted pair forming the channel to optimize available channel bandwidth utilization.

15. A method as defined in claim 14, wherein the step of dynamically allocating discrete frequency bands comprises:
determining a distance a signal will travel over the first wire of the two-wire twisted pair, physical properties of the first wire of the two-wire twisted pair, and current service demands of each piece of equipment of the plurality of different types of equipment to define utilization characteristics; and performing the dynamic allocation responsive to the utilization characteristics.

16. A method as defined in claim 14, wherein the step of dynamically allocating discrete frequency bands comprises:

assigning a discrete frequency band responsive to one or more of the following utilization characteristics: type of services available, customer service demands, and quality of service requirements; and adjusting the assigned frequency band in response to a change in one or more of the following utilization characteristics: the type of services available, the customer service demands, and the quality of service requirements.

17. A method as defined in claim 1, wherein each of the second plurality of twisted pair links includes at least one twisted pair wire defining a common twisted pair wire, and wherein the method further comprises the steps of:

assigning each of the plurality of different service types to a corresponding plurality of discrete frequency bands for transmission over the common twisted pair wire;

employing control signals to initially configure frequency allocation assignments for each of the plurality of different service types;

identifying signal degradation resulting in a reduction in quality of service below a threshold value for one of the plurality of service types; and dynamically reassigning a frequency range for transmission of a signal associated with the one of the plurality of service types experiencing signal degradation from a first prior assigned frequency range to a second assigned frequency range.

18. A method as defined in claim 1, wherein the point of presence equipment is configured to provide service to a plurality of different types of equipment, the different types of equipment comprising video, audio, and data signal producing equipment located at each of the first and the second plurality of facilities;

wherein each of the first and the second plurality of twisted pair links comprise a plurality of two wire twisted pairs forming a plurality of separate channels;

wherein the point of presence equipment includes a plurality of transmitters each separately connected to a first wire of a pair of wires forming one of the plurality of separate channels, and a plurality of receivers each connected to a second wire of the pair of wires forming one of the plurality of separate channels for each of the first and the second plurality of twisted pair links; and wherein the method further comprises performing the following for each link associated with each separate one of the first and the second plurality of facilities:

determining a desired range of frequencies for transmitting a signal, determining frequency spectrum availability of the first wire each of the plurality of channels for the respective link, and selecting one of the plurality of transmitters connected to the first wire of one of the plurality of channels for the respective link from among the plurality of channels having frequency spectrum availability sufficient to support the desired range of frequencies for transmitting the signal.

19. A method as defined in claim 1, further comprising the steps of:

connecting each intermediate connection node to a separately located existing vertical member, the vertical member comprising one or more of the following: a pre-existing telephone pole, a pre-existing lighting pole, a roof of a pre-existing adjacent facility, and a pre-existing tower, the associated one of the second plurality of twisted pair links extending between the respective intermediate connection node and the corresponding point of presence equipment, the associated one of a plurality of alternative communication links extending between the respective intermediate connection node and the central premises equipment located at the corresponding one of the second plurality of facilities; and connecting the common optical-wireless connection node to a separately located existing vertical member, the vertical member comprising one or more of the following: a pre-existing telephone pole, a pre-existing lighting pole, a roof of a pre-existing adjacent facility, and a pre-existing tower, when at least one of the third plurality of facilities is not in a line of sight to a desired connection point on the vertical member.

20. A method of providing communications over a hybrid communications network to a plurality of geographically separately located facilities each having a pre-existing network of conventional twisted pair wire with minimal retrofit requirements, the method comprising the steps of:

configuring a hybrid communications network to provide a network connection between a point of presence for a service provider and each of a first plurality of facilities over a corresponding first plurality of unshielded twisted pair wires defining a first plurality of twisted pair links extending between the point of presence and the corresponding first plurality of facilities, each facility of the first plurality of facilities including central premises equipment configured to receive and transmit data over an associated dedicated one of the first plurality of twisted pair links connected between the first plurality of facilities and the point of presence and configured to receive and transmit data over on-premises twisted pair wire pre-existing within the respective facility, the point of presence located remotely from each of the first plurality of facilities and including point of presence equipment configured to receive and transmit data over each of the plurality of dedicated twisted pair links, a distance between the point of presence and each separate one of the first plurality of facilities being within a range of approximately 6000 feet; and configuring the hybrid network to provide a network connection between the point of presence and each of a second plurality of facilities over a corresponding plurality of hybrid links extending between the point of presence and the corresponding second plurality of facilities, each hybrid link comprising one of a second plurality of twisted pair links, one of a plurality of alternative communication links comprising one or more of the following: an adaptive network link and an optical network link, and comprising twisted pair link-to-adaptive network link connection equipment defining a respective intermediate connection node, each facility of the second plurality of facilities including central premises equipment configured to receive and transmit data over an associated dedicated one of the plurality of hybrid links connected between the second plurality of facilities and the point of presence, and configured to receive and transmit data over on-premises twisted pair wire pre-existing within the respective facility, the point of presence located remotely from each of the second plurality of facilities and including point of presence equipment configured to receive and transmit data over each of the plurality of dedicated hybrid links, a distance between the point of presence and each separate one of the second plurality of facilities substantially exceeding a certain distance range, whereby the distance range between the point of presence and each separate one of the second plurality of facilities prohibits use of digital line subscriber and asymmetric digital line subscriber technologies over the second plurality of twisted pair links; and configuring the hybrid network to provide a network connection between the point of presence and each of a third plurality of facilities over a corresponding plurality of optical-wireless links extending between the point of presence and the corresponding third plurality of facilities, each optical-wireless link comprising a common optical link extending between the point of presence and a common optical-wireless connection node configured to provide a separate wireless connection to each of the third plurality of facilities, each facility of the third plurality of facilities including central premises equipment configured to receive and transmit data over the wireless connection with the optical-wireless connection node, and configured to receive and transmit data over on-premises twisted pair wire pre-existing within the respective facility, the point of presence located remotely from each of the third plurality of facilities and including point of presence equipment configured to receive and transmit data over the optical-wireless links.

* * * * *

UNITED STATES PATENT AND TRADEMARK OFFICE
CERTIFICATE OF CORRECTION

| | | |
|---|---|---|
| PATENT NO. | : 7,916,777 B1 | Page 1 of 1 |
| APPLICATION NO. | : 12/512003 | |
| DATED | : March 29, 2011 | |
| INVENTOR(S) | : Jesse A. Johnson et al. | |

It is certified that error appears in the above-identified patent and that said Letters Patent is hereby corrected as shown below:

On the Title page, Item [54] and column 1, in the title:

After the word "Command" insert the word -- Management --;

On Column 2, line 12, delete "Wimaxx" and after "and" insert -- WIMAX --; line 32, delete "Wimaxx" and after "and" insert -- WIMAX --; line 43, delete "Wimax" and after "or" insert -- WIMAX --; line 47 delete "Wimax" and after "and" insert -- WIMAX --; line 50, delete "Wimaxx" and after "and" insert -- WIMAX --;

On Column 3, line 63, delete "Wimaxx" and after "for" insert -- WIMAX --;

On Column 5, line 31, delete "Wimaxx" and after "DSL," insert -- WIMAX --; line 39, delete "wide spread" and after "the" insert -- widespread --;

On Column 17, line 47, delete "Out line."" and insert -- Out" line. --;

On Column 18, line 53, delete "5" and after "Fig." insert -- 8 --; and

On Column 19, line 8, delete """ after "perform".

Signed and Sealed this
Tenth Day of July, 2012

David J. Kappos
*Director of the United States Patent and Trademark Office*